United States Patent Office 3,244,771
Patented Apr. 5, 1966

3,244,771
SYNTHETIC RESINS
Walter Krauss, Cologne-Stammheim, and Reinhard Hebermehl and Karl-Heinz Mielke, Leverkusen, Germany, assignors to Farbenfabriken Bayer Aktiengesellschaft, Leverkusen, Germany, a German corporation
No Drawing. Filed July 19, 1961, Ser. No. 125,101
Claims priority, application Germany, July 30, 1960, F 31,811
3 Claims. (Cl. 260—858)

This invention relates generally to synthetic resins and more particularly to an improved synthetic resin for use in making lacquers.

It has been proposed heretofore, to prepare lacquers from polycarbonate plastics. Polycarbonates are prepared by a process in which a dihydroxyl compound is reacted with phosgene or a diester of carbonic acid. The dihydroxyl compound, preferably, is a bis(monohydroxy aryl alkane) such as, for example, 2,2-(4,4'-dihydroxy diphenyl) propane. Processes for making polycarbonate plastics are disclosed, for example, in German specifications 971,790, 971,777, 959,497 and 1,011,148; Canadian Patents 578,585 and 578,795; and U.S. Patents 2,946,766, 2,964,794 and 2,964,797. The polycarbonate plastics are water resistant and also resist the attack of many chemicals including acetic acid, hydrochloric acid and sulphuric acid. Polycarbonates have been used to prepare compositions which can be used to prepare dried films, but like most other compositions of this type, the resulting film is sensitive to organic solvents and the composition is not compatible with many other lacquer binders.

It has also been proposed to react a polyester with an alkyl carbonate to reduce the acidity thereof. This process produces a compound in which the carboxyl groups in the polyester have been reacted with the carbonate.

It is an object of this invention to provide a method for making an improved lacquer containing a polycarbonate plastic. Another object of the invention is to provide a film forming composition containing a polyester based on a polycarbonate. Still another object of the invention is to provide a method for making a substantially water resistant and chemical resistant resin which is compatible with other materials used in preparing lacquers. A still further object of the invention is to provide lacquers having properties which can be used to advantage for coating various materials, such as metals, wood and the like.

The foregoing objects and others are accomplished in accordance with this invention, generally speaking, by providing a resin through reaction of a polycarbonate plastic with a predominantly hydroxyl terminated polyester prepared from a polyhyric alcohol and a polycarboxylic acid. The synthetic resin is dissolved in a suitable solvent therefor to form a lacquer. The resulting lacquer produces a substantially water resistant and chemical resistant film and contains terminal hydroxyl groups which can be reacted with an organic polyisocyanate to form an improved coating. In addition to being more water resistant than the conventional polyester prepared from a polycarboxylic acid and a polyhydric alcohol, the new resin is also more heat resistant.

The new resin is prepared by a condensation or transesterification process in which the hydroxyl containing polyester and the polycarbonate are dissolved in a suitable inert solvent therefor and the resulting solution is heated to a temperature of about 100° C. to about 200° C. until the desired reaction has been obtained. An organic polyisocyanate is added to the condensation product in a preferred embodiment of the invention.

It is not exactly known what happens in the reaction. It is believed that in the condensation the hydroxyl groups of the polycarbonate and the hydroxyl groups of the polyester will condense together under the formation of ether linkages. It might, however, also be possible that the carbonate linkage splits to a certain degree and a transesterification with the hydroxyl groups of the polyester occurs. The product, however, always contains carbonate and ester linkages and at least to some degree ether linkages. In the event an organic polyisocyanate is added the remaining hydroxyl groups of the resin react with the isocyanate groups under formation of urethane groups. It could be stated that the resin contains molecular groupings like

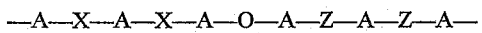

wherein the A's are the same or different organic radicals, the X's are ester groupings —COO— and the Z's are carbonate groupings

The polycarbonate plastic can be prepared by any suitable method such as any of the methods disclosed in the German specifications, Canadian patents and U.S. patents listed hereinbefore. For example, any suitable aromatic dihydroxy compound such as hydroquinone or resorcinol, but most preferably a bis(monohydroxy aryl alkane) alone or in admixture with an aliphatic or cycloaliphatic dihydroxy compound can be reacted with an aliphatic or aromatic diester of carbonic acid or with phosgene or, if desired, the polycarbonate can be prepared by reaction of a bis chlorocarbonic acid ester of an aromatic dihyroxy compound with an aromatic, aliphatic or cycloaliphatic compound. Preferably, the polycarbonate should have a K-value within the range of from about 40 to about 60.

Polycarbonate plastics are characterized by repeating groupings of

wherein R is an arylene radical. The new resin provided by this invention contains such groupings and also repeating groupings derived from the polyester represented by

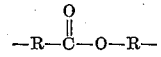

wherein R is a divalent organic radical, aliphatic, aromatic or cycloaliphatic.

Any suitable polyester prepared by esterification of a polyhydric alcohol and a polycarboxylic acid can be used, but it is preferred that the polyester have an OH number of from about 50 to about 450, an acid number of not more than about 10 and a molecular weight of from about 250 to about 2200.

Any suitable polyhydric alcohol having up to six or more hydroxyl groups can be used to make the polyester, but it is preferred that the polyhydric alcohol be one which has two or three hydroxyl groups. Examples of suitable polyhydric alcohols include ethylene glycol, diethylene glycol, propylene glycol, butylene glycol, trimethylol propane, hexanetriol, glycerol and the like.

Any suitable polycarboxylic acid can be used to prepare the polyester, but it is preferred to use a dicarboxylic acid either aliphatic or aromatic. Examples of suitable acids include adipic acid, succinic acid, phthalic acid or phthalic anhydride, terephthalic acid, malonic acid, maleic acid, cyclohexane dicarboxylic acid and the like. An excess of the polyhydric alcohol is used in preparing the polyester in order that the desired hydroxyl number will be obtained.

As indicated hereinbefore, the polyester and the polycarbonate are reacted together preferably at a temperature of from about 100° C. to about 200° C., the most preferred temperature range for the reaction being from about 150° C. to about 200° C. The preferred ratio of polycarbonate to polyester is from about 1 to 3 and about 2 to 1, respectively. Any other proportion can be used, but some proportion within the preferred range gives the best results.

The reaction between the polycarbonate and polyester is conducted in an inert organic solvent for the product. Any inert organic solvent for the product such as, for example, tetrahydronaphthalene, decahydronaphthalene, methyl glycol acetate, ethyl glycol acetate and the like can be used.

In one embodiment of preparing the novel resin provided by this invention, a polycarbonate and polyester are mixed with an inert solvent and the resulting mixture is heated slowly under reflux until the desired reaction has been obtained. Usually the mixture will become clear within 1 to 3 hours indicating that the reaction is complete. This solution can be applied to glass plates and a clear film will be formed thereon. The solvent is removed from the film by evaporation.

The resin can be separated from the solvent by distillation, if desired. The product is yellow or golden brown in color and can be dissolved in a solvent such as toluene. Depending upon the hydroxyl number of the polyester used and upon the proportion of polyester to polycarbonate used, the resulting solution of resin will have an hydroxyl content of from about 0.5% to about 10% calculated on the solid content of the solution.

Lacquers such as, for example, the solution of resin in the solvent described above can be used for covering or coating various supports such as, metal objects, wood paneling or the like. The product obtained in accordance with this invention is compatible with polyisocyanates. An organic polyisocyanate or a blocked organic polyisocyanate can be mixed with the solution of the new resin. Films formed from the latter are more elastic than films produced from the polyester-polycarbonate reaction product. The new lacquer solution is compatible with various raw materials used in making lacquers and consequently can be combined therewith. Preferably, the solution of the new resin is applied to the support and heated to cure. The new resin, while in solution, can be mixed with various pigments, fillers, glass fabrics and the like to make a lacquer particularly advantageous for use as insulation on electrical devices.

The amount of polyisocyanate used can vary from less than the equivalent amount to more than an equivalent amount based upon the hydroxyl content of the product. It is preferred to use an equivalent amount of polyisocyanate based on the hydroxyl content of the new resin. The reaction between the polyisocyanate and the hydroxyl groups of the new resin can be accelerated, if desired, with a suitable catalyst such as a tertiary amine.

Suitable amine catalysts are disclosed in Re. 24,514.

Any suitable organic polyisocyanate including those disclosed in the said reissue patent can be used. Examples of suitable polyisocyanates include tetramethylene diisocyanate, hexamethylene diisocyanate, thiodipropyl diisocyanate, ω,ω'-diisocyanatodialkyl benzenes or naphthalenes, cyclohexane diisocyanates, aryl diisocyanates and diisocyanates and polyisocyanates of the alkyl and aryl substitution products of benzene and naphthalene, as well as their partial hydrogenation products 3-(ω-isocyanatoethyl)-phenyl isocyanate, diphenyl ether polyisocyanates and diphenyl sulphone polyisocyanates.

Those reaction products containing free isocyanate groups which are obtained by reacting the aforesaid diisocyanates and polyisocyanates with compounds containing reactive hydrogen atoms, for example with alcohols, phenols, amines, polyesters, polyethers, polythioethers or also polyacetals can be used. The products which can be produced by partial polymerization of partially alkylated or arylated polyisocyanates according to German specifications 1,035,362 and 1,013,869 are also suitable as polyisocyanates or substances splitting off polyisocyanates.

The polycarbonate used in preparing the resin provided by this invention should preferably have the K-value set forth above. This K-value is determined in accordance with the "Fikentscher Method" described in Cellulose Chime, volume XIII, page 58 (1932). A preferred method of determining the K-value of polycarbonates involves preparing a 1% solution of the polycarbonate in methylene chloride or meta cresol. The absolute viscosity of the solution is measured at 20° C. with a Ubbelohde Viscosimeter. The relative viscosity is then determined by calculation. The determination of the K-value is a method of determining the molecular weight of a high molecular weight compound. Details are given in Fikentscher, "Die Messung der Viskositat solvatisierter Sole," published 1941, by I. G. Farbenindustrie AG., Hauptlaboratorium, Ludwigshafen, reference is made to chapter I, pages 3, 4 and 8.

*Example 1*

About 50 parts by weight of a polycarbonate of high molecular weight which has been obtained by reacting 2,2-(4,4'-dihydroxy diphenyl)-butane with phosgene according to German specification 971,790 and which has the K-value of about 50 are dissolved in a solvent mixture consisting of about 62.5 g. of toluene, about 66 g. of tetralin, about 12.5 g. of ethyl glycol acetate, about 12.5 g. of butyl acetate and about 12.5 g. of ethyl acetate. The solution has added thereto about 50 g. of a polyester containing hydroxyl groups and obtained from about 1 mol of phthalic anhydride, about 1 mol of trimethylol propane and about 0.75 mol of ethylene glycol. The cloudy solution which forms is heated to about 190° C. while distilling off the low-boiling solvents and is kept at this temperature until it becomes clear, this taking about 2 hours. When a test sample cast onto a glass sheet also remains clear after evaporating the solvent and after stoving for a short time at about 150° C., the residual solvent is distilled off in vacuo. A golden-yellow resin is obtained which is very highly viscous at room temperature and which can be taken up in organic solvents such as esters or ketones, but has only limited solubility in aromatic substances. Hydroxyl content about 5.0%; acid number about 2.0.

*Example 2*

About 25 parts by weight of a polycarbonate of high molecular weight which has been obtained by reacting 2,2-(4,4'-dihydroxy-diphenyl)-butane with phosgene according to German specification 971,790 and has approximately the K-value of about 50, are dissolved in a solvent mixture consisting of about 66 g. of tetralin, about 43.7 g. of toluene, about 18.7 g. of ethyl glycol acetate, about 18.7 g. of butyl acetate and about 18.7 g. of ethyl acetate. About 75 g. of a polyester which contains hydroxyl groups and which is obtained from about 3 mols of adipic acid, about 2 mols of 1,4-butylene glycol and about 2 mols of hexanetriol are added to this solution. The cloudy solution is heated to about 190° C. while distilling off the low-boiling solvents and is kept at this temperature until it becomes clear, this taking 100 to 120 minutes. When a test sample cast onto a glass sheet also remains clear after evaporating the solvent and after stoving for a short time at about 150° C., the residual solvent is distilled off in vacuo. The golden-yellow viscous product which remains has a hydroxyl content of about 5.2% with an acid number of about 5.1.

*Example 3*

About 100 parts by weight of the product obtained by the process disclosed in Example 1 are dissolved in about 300 parts by weight of a solvent mixture consisting of equal parts of methyl glycol acetate, butyl acetate, ethyl acetate and toluene and about 120 parts by weight of about 75% solution in ethyl acetate of the reaction product of about 3 mols of toluylene diisocyanate and about 1 mol of trimethylol propane (—NCO content about 13%, based on about 75% solution) are added thereto. Using this solution, coatings are made on glass sheets and metal sheets. After drying overnight at room temperature, very hard but nevertheless still sufficiently elastic films are obtained with good resistance to solvents. The lacquer solution gels after two days at room temperature.

*Example 4*

A resin is prepared as described in Example 1, except that, in the preparation of the polyester containing hydroxyl groups to be employed, the phthalic anhydride is replaced by the equimolar quantity of dimethyl terephthalate. The resin resulting from the reaction with the polycarbonate has an hydroxyl content of about 4.8% and an acid number of about 0.

About 100 parts by weight of this resin are dissolved in about 200 parts by weight of a solvent mixture consisting of equal parts of methyl glycol acetate, butyl acetate and toluene and there are added about 390 parts by weight of a solution of about 130 parts by weight of the masked isocyanate of about 3 mols of toluylene diisocyanate, about 1 mol of trimethylol propane and about 3 mols of phenol in about 260 parts by weight of the same solvent mixture. The lacquer solution can be kept for an unlimited period of time in closed vessels at room temperature and can be employed on wire-lacquering machines by known methods for the insulation of electric conductors.

Although the invention has been described in considerable detail in the foregoing, it is to be understood that such detail is solely for the purpose of illustration and that variations can be made by those skilled in the art without departing from the spirit and the scope of the invention except as set forth in the claims.

What is claimed is:

1. A synthetic resin prepared by reacting an organic polyisocyanate with the reaction product produced by the condensation of a polycarbonate having a K value of at least 40 and a branched polyester, said polyester having been prepared by esterification of a polyhydric alcohol having at least three hydroxyl groups and a dicarboxylic acid, said reaction product having a hydroxyl content of from about .5% to about 10%.

2. A method for making a coating composition which comprises condensing a polyester having at least three hydroxyl groups with a polycarbonate having a K value of at least 40, said polycarbonate having been prepared by reacting a di(monohydroxy aryl)alkane with a derivative of a carbonic acid selected from the group consisting of carbonic acid diesters, phosgene, and bis-chloro carbonic acid esters of a di(monohydroxy aryl) alkane; said polyester having been prepared by esterification of a polyhydric alcohol having at least three hydroxyl groups and a polycarboxylic acid; and thereafter mixing the condensation product and a polyisocyanate having at least three —NCA groups with an inert organic solvent.

3. The product of the process of claim 2.

References Cited by the Examiner

UNITED STATES PATENTS

| | | | |
|---|---|---|---|
| 2,935,487 | 5/1960 | Fox et al. | 260—858 |
| 2,999,844 | 9/1961 | Muller et al. | 260—47 |
| 3,000,849 | 9/1961 | Clachan et al. | 260—30.4 |
| 3,110,686 | 10/1963 | Newton | 260—77.5 |

OTHER REFERENCES

Natural and Synthetic High Polymers, Meyer Interscience Publishers Inc., N.Y., 1950, p. 251.

MURRAY TILLMAN, *Primary Examiner.*

LEON J. BERCOVITZ, *Examiner.*

J. A. KOLASCH, P. LIEBERMAN, *Assistant Examiners.*